(12) United States Patent
Liljedahl et al.

(10) Patent No.: US 11,122,937 B2
(45) Date of Patent: Sep. 21, 2021

(54) POT GRIPPER AND COOKING SYSTEM COMPRISING THE POT GRIPPER AND A POT

(71) Applicant: Fenix Outdoor Development and CSR AG, Zug (CH)

(72) Inventors: Niklas Liljedahl, Solna (SE); Eric Svartström, Solna (SE)

(73) Assignee: Fenix Outdoor Development and CSR AG, Zug (CH)

(\*) Notice: Subject to any disclaimer, the term of this patent is extended or adjusted under 35 U.S.C. 154(b) by 111 days.

(21) Appl. No.: 16/099,920

(22) PCT Filed: May 9, 2017

(86) PCT No.: PCT/EP2017/061025
§ 371 (c)(1),
(2) Date: Nov. 8, 2018

(87) PCT Pub. No.: WO2017/194521
PCT Pub. Date: Nov. 16, 2017

(65) Prior Publication Data
US 2019/0174964 A1     Jun. 13, 2019

(30) Foreign Application Priority Data
May 9, 2016  (DE) .................... 10 2016 207 933.6

(51) Int. Cl.
*A47J 45/10*   (2006.01)
*B25B 7/02*    (2006.01)
*B25B 7/14*    (2006.01)

(52) U.S. Cl.
CPC ................ *A47J 45/10* (2013.01); *B25B 7/02* (2013.01); *B25B 7/14* (2013.01)

(58) Field of Classification Search
CPC .......... A47J 45/071; A47J 45/10; B25B 7/02; B25B 7/14
(Continued)

(56) References Cited

U.S. PATENT DOCUMENTS 1,142,198 A  *  6/1915  Niec .................... A47J 45/10
                                                  294/31.1
1,455,216 A     5/1923  Lombardi
(Continued)

FOREIGN PATENT DOCUMENTS

DE          4033066 A1     4/1992

OTHER PUBLICATIONS

International Written Opinion for International Application No. PCT/EP2017/061025 dated Sep. 13, 2017, 7 pages.
(Continued)

*Primary Examiner* — Dean J Kramer
(74) *Attorney, Agent, or Firm* — TraskBritt (57) ABSTRACT

A pot gripper comprises a first lever and a second lever joined at a fulcrum. The first lever has a first jaw extending from the fulcrum, and the second lever has a second jaw extending from the fulcrum. The first jaw and the second jaw define a clamping area for a pot when the first lever and the second lever are rotated from an open position into a closed position. The first jaw has at least one support slot, the support slot being shaped to fit to the contour of a gripping area of the pot to be held in the clamping area. The first lever has a first locking feature and the second lever has a second locking feature. The first locking feature engages with the second locking feature in the closed position so that the first lever and the second lever are locked in the closed position.

12 Claims, 7 Drawing Sheets

(58) Field of Classification Search
USPC .................................................. 294/30, 31.1
See application file for complete search history.

(56) References Cited

U.S. PATENT DOCUMENTS

| | | | | |
|---|---|---|---|---|
| 1,578,816 A * | 3/1926 | Eifried | ................... | A47J 45/10 |
| | | | | 294/3 |
| 1,840,775 A * | 1/1932 | Hardy | ................... | A47J 45/10 |
| | | | | 294/31.1 |
| 1,991,307 A | 2/1935 | Worden | | |
| 2,090,674 A * | 8/1937 | Grenzeback | ............ | A47J 45/10 |
| | | | | 294/31.1 |
| 2,168,730 A | 8/1939 | Chicchiello | | |
| 3,232,657 A * | 2/1966 | Thompson | ............ | A47J 45/071 |
| | | | | 294/31.1 |
| 2006/0208511 A1* | 9/2006 | Romsburg | .............. | A47J 45/10 |
| | | | | 294/31.1 |
| 2007/0266526 A1* | 11/2007 | Buckingham | ........... | A47J 45/10 |
| | | | | 16/425 |

OTHER PUBLICATIONS

International Search Report for International Application No. PCT/EP2017/061025 dated Sep. 13, 2017, 5 pages.

* cited by examiner

POT GRIPPER AND COOKING SYSTEM COMPRISING THE POT GRIPPER AND A POT

CROSS-REFERENCE TO RELATED APPLICATIONS

This application is a national phase entry under 35 U.S.C. § 371 of International Patent Application PCT/EP2017/061025, filed May 9, 2017, designating the United States of America and published in English as International Patent Publication WO 2017/194521 A1 on Nov. 16, 2017, which claims the benefit under Article 8 of the Patent Cooperation Treaty to German Patent Application Serial No. 10 2016 207 933.6, filed May 9, 2016.

TECHNICAL FIELD

This disclosure relates to a pot gripper. In general, a pot gripper comprises a first lever and a second lever being joined at a fulcrum. The first lever has a first jaw extending from the fulcrum and the second lever has a second jaw extending from the fulcrum. The first jaw and the second jaw define a clamping area for a pot when the first lever and second lever are rotated from an open position into a closed position. Further, the disclosure relates to a cooking system comprising the pot gripper and a pot.

BACKGROUND

Pot grippers are conventionally used for outdoor cooking equipment. In principle, the outdoor cookware, e.g., a pot, is provided without a handle to place the cookware on top of the burner or to remove the cookware from the burner. The reason for having no handle at all or a removable handle is space saving, as the handle normally protrudes from the outer circumferential surface of the cookware. While placing the cookware on the burner is normally possible, removing the cookware therefrom after preparing the food is cumbersome without a handle, as the cookware distinctly heated up and cannot be gripped with bare hands. In addition, having the handle removed during cooking is also increasing safety, as one may not accidentally stumble over the handle.

Thus, pot grippers are used that could, in principle, be seen as a detachable handle. The pot grippers known from the prior art are either of the plier type or foldable ones. However, the cookware, in general, has a respective supporting portion where the pot gripper is to be attached to. In other words, the pot gripper always has to be attached to a specific position on the cookware.

However, in case the cook is not careful when placing the cookware on the burner without the pot gripper, it might happen that the support portion is, e.g., hidden behind the windshield and the cook cannot easily attach the pot gripper to the support portion after the food has been prepared. Rather, the cook has to detach the windshield to access the support portion at all. This is cumbersome and the risk that the cookware is dropped from the burner is distinctly increased. In addition, there is the drawback that the known pot grippers are sometimes not firmly attached to the support portion, so that the cookware may inadvertently be released from the pot gripper and drop on the floor. As a matter of course, the food prepared will be lost in such a case.

Thus, there is the need for an ameliorated pot gripper and an ameliorated cooking system. The problem is solved by the pot gripper and the cooking system disclosed herein. Preferable embodiments are described in the dependent claims.

BRIEF SUMMARY

The disclosure is characterized over the prior art in that the first jaw has at least one support slot, the support slot being shaped to fit to the contour of a gripping area of the pot to be held in the clamping area. Thus, this allows holding the pot to be gripped in a safe manner. In addition, as the gripping area of the pot in general extends along the entire circumference of the open side of the pot, the pot gripper can be attached randomly to the pot.

Preferably or alternatively, the first lever has a first locking means and the second lever has a second locking means, and the first locking means engages with the second locking means in the closed position, so that the first lever and the second lever are locked in the closed position. Thus, the pot gripper can be locked in the closed position so that the pot gripper is attached to the pot like a handle, i.e., virtually immobile relative to the pot. Thus, risk of accidental separation of the pot from the pot gripper is greatly reduced.

Preferably, the first locking means comprises an opening and the second locking means comprises a catch, wherein the catch reaches through the opening in closed position. This allows for the locking to be conveniently achieved.

Preferably, the second locking means further comprises a biasing means, wherein the catch is manually moveable against a biasing force of the biasing means when the first lever and the second lever are in the closed position, so that the first lever and the second lever are unlocked. Hence, the unlocking process is comfortable. In addition, the unlocking process is initiated in that the catch is manually displaced, but there is no need to hold up the pot, which is hot, especially when placed on top of the burner. Preferably, the biasing means is a coil spring.

Preferably, the pot gripper comprises a spring member, wherein the spring member biases the first lever and/or the second lever into the open position, the spring member preferably being a torsion spring. Thus, separation of the pot gripper from the pot is facilitated.

Preferably, the first jaw has at least one first flange portion, the first flange portion being configured to abut against an outer circumferential surface of the pot, when the first lever and the second lever are in the closed position. In addition, it is preferable that the second jaw has at least one second flange portion, the second flange portion being configured to abut against an inner circumferential surface of the pot, when the first lever and the second lever are in the closed position. Thus, this allows for a stable securement of the pot gripper to the pot, as a tilting movement of the pot relative to the pot gripper is prevented.

Preferably, the first flange portion and/or the second flange portion has a resilient surface portion, wherein the surface portion is compressible by the pot when the first lever and the second lever are moved from the open position into the closed position. Thus, this further avoids movement of the pot relative to the pot gripper.

Preferably, the first jaw and the second jaw comprises insulation means for heat insulation of the first lever and the second lever. Thus, the heat caused by the burner and transferred to the pot is not further transferred to the pot gripper, or at least the portions the user is placing their hands on. Thus, the risk for burn is greatly reduced.

Preferably, the first lever has a first handle extending from the fulcrum and the second lever has a second handle extending from the fulcrum, wherein the first jaw is inclined relative to the first handle and/or the second jaw is inclined relative to the second handle. Thus, this allows easily placing the jaws onto the gripping area of the pot and moving the levers into the closed position.

The problem is further solved by a cooking system comprising a pot gripper as defined above and a pot, wherein the outer circumferential surface of the pot is free of a supporting structure. Preferably, the pot has a circumferential gripping area at the open side of the pot, wherein the diameter of the gripping area increases when seen from the bottom area of the pot. Thus, this allows for a safe attachment of the pot gripper to the pot.

BRIEF DESCRIPTION OF THE DRAWINGS

Specific embodiments of the disclosure will now be described below, by way of example, with reference to accompanying drawings, of which.

DETAILED DESCRIPTION

As shown in the figures, the pot gripper 1 comprises a first lever 2 and a second lever 3, The first lever 2 and the second lever 3 are joined by a fulcrum 4. In this embodiment, the fulcrum 4 is an axle. The first lever 2 has a first jaw 5 extending from the fulcrum 4 to one side and a first handle 17 extending from the fulcrum 4 to the other side. The second lever 3 has a second jaw 6 extending from the fulcrum 4 to one side and a second handle 18 extending from the fulcrum 4 to the other side. The pot gripper 1 can be rotated between an open position OP and a closed position CP in that the first handle 17 and the second handle 18 are rotated about the fulcrum 4. In the closed position, the first jaw 5 and the second jaw 6 define a clamping area for a pot (not shown).

Figure 1:
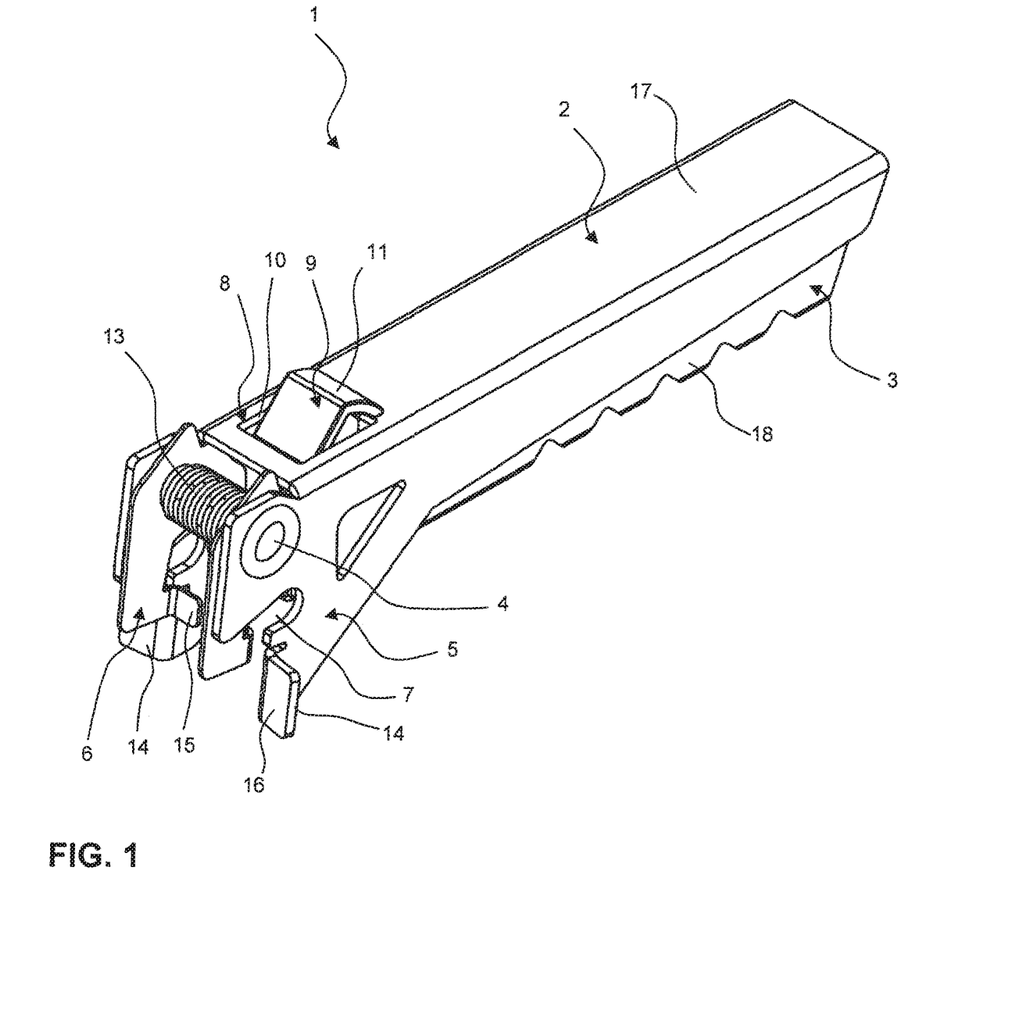
FIG. 1 is a perspective view of the pot gripper in the closed position.
Figure 2:
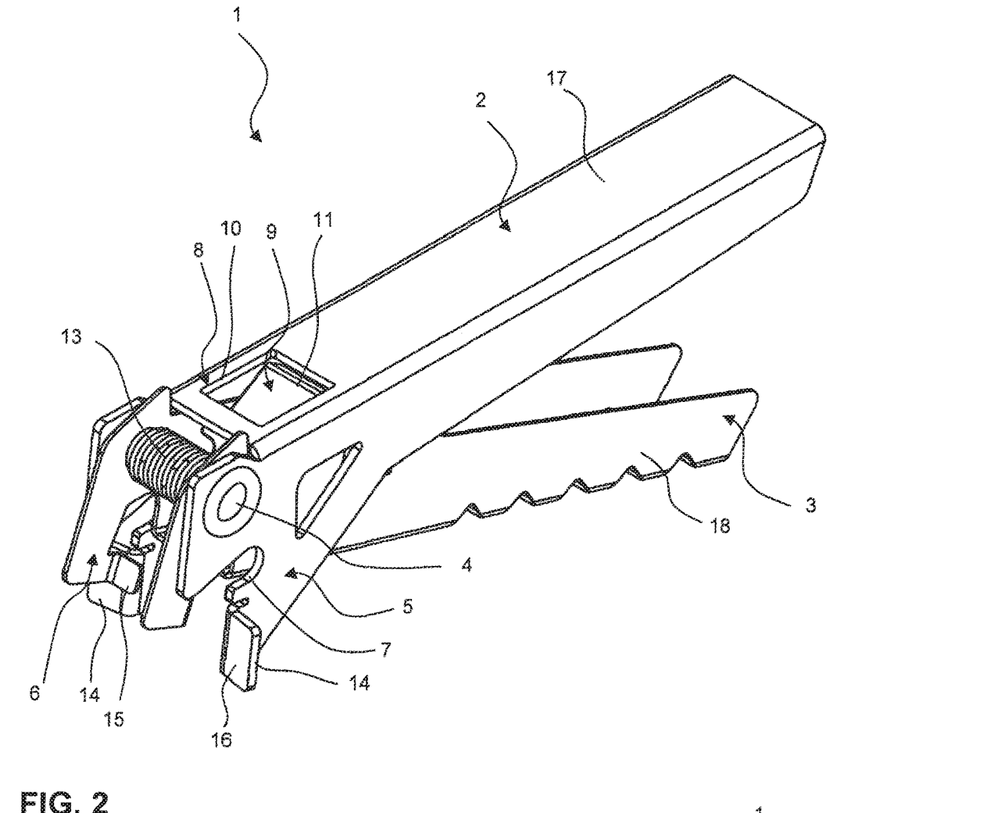
FIG. 2 is a perspective view of the pot gripper in the open position
Figure 3:
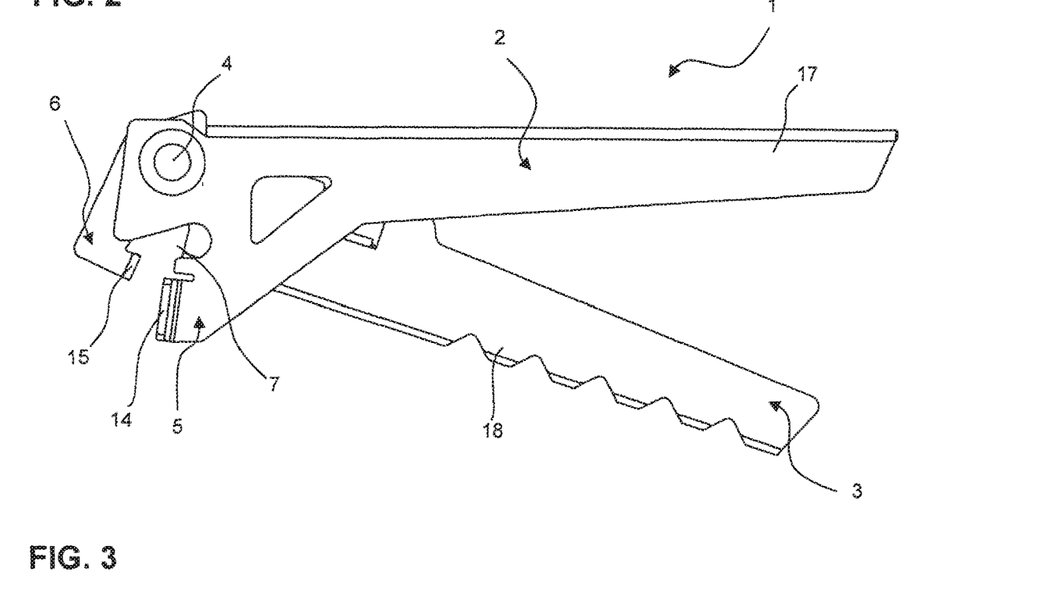
FIG. 3 is a side view of the pot gripper in the open position.
Figure 4:
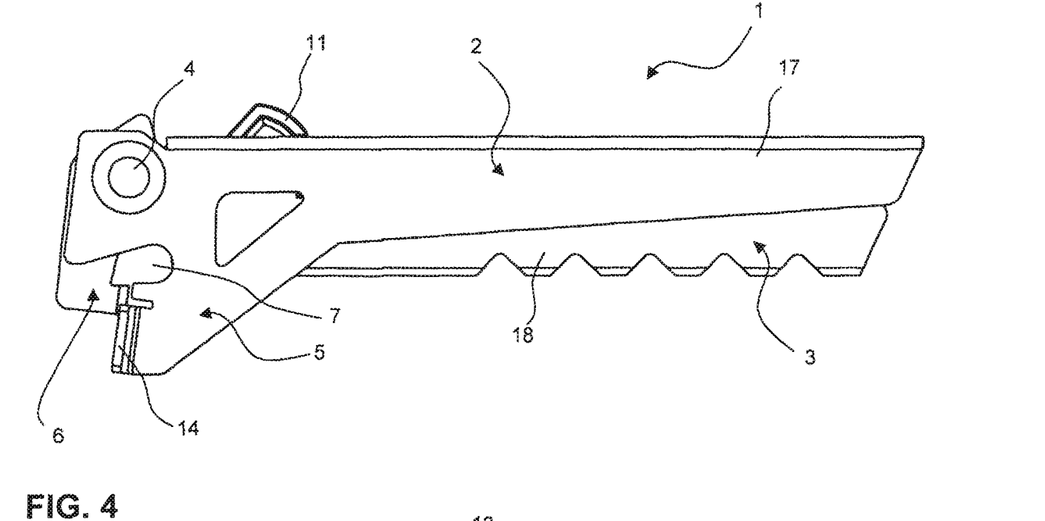
FIG. 4 is a side view of the pot gripper in the closed position.
Figure 5:
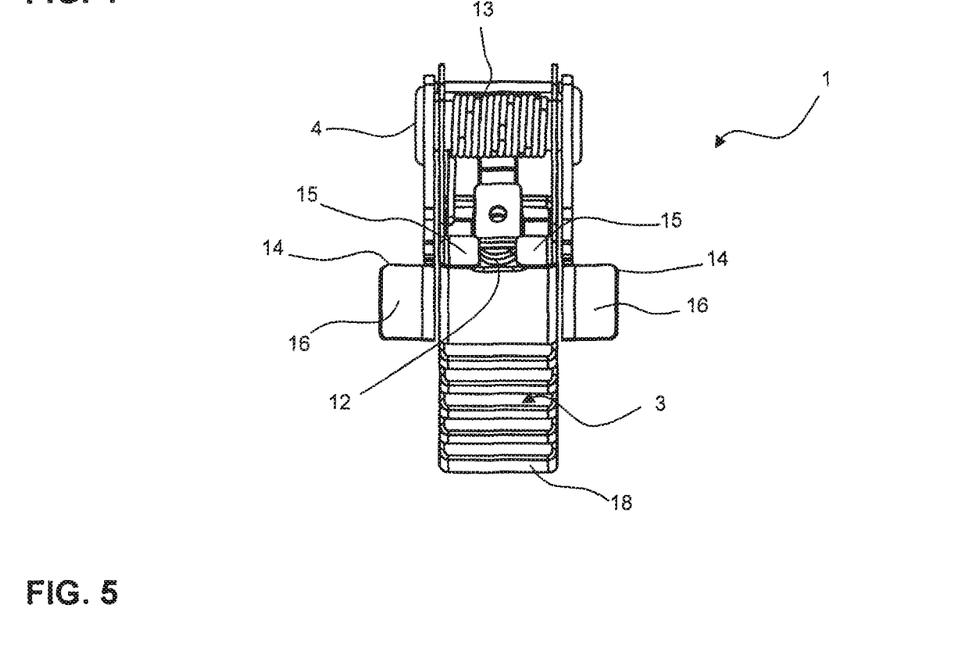
FIG. 5 is a front view of the pot gripper in the open position.
Figure 6:
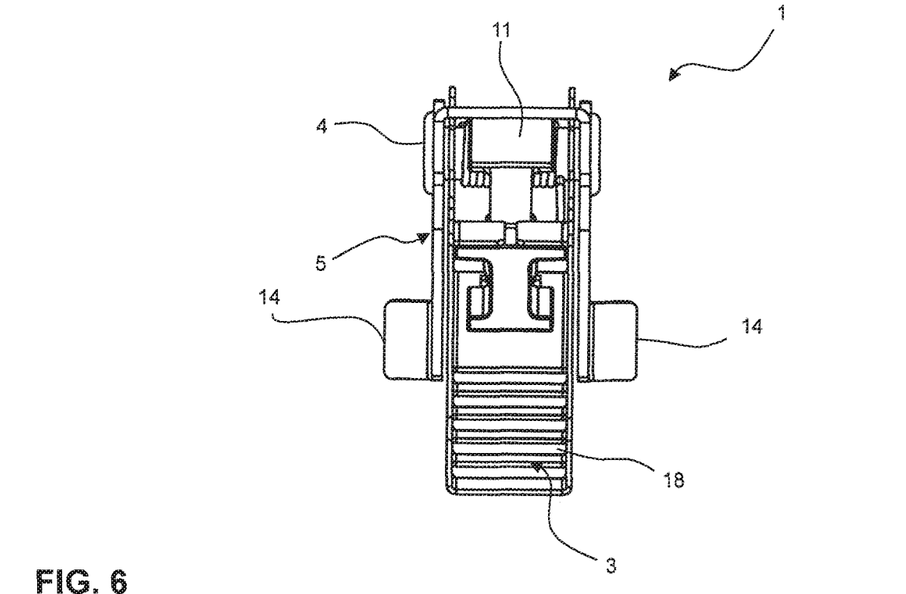
FIG. 6 is a back view of the pot gripper in the open position.
Figure 7:
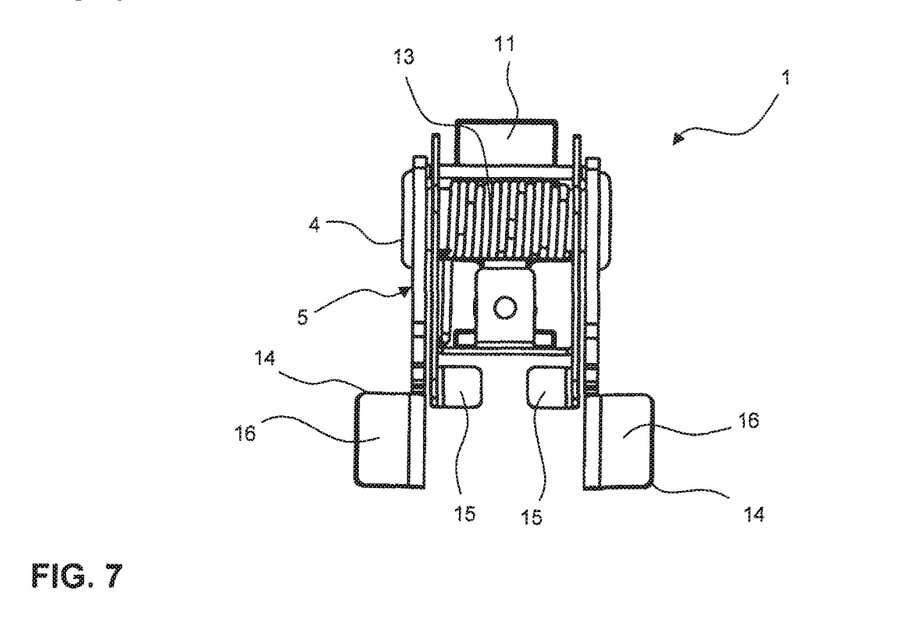
FIG. 7 is a front view of the pot gripper shown in the closed position.

As can be seen, e.g., in FIG. 1, the first jaw 5 comprises a support slot 7 on each side of the first jaw 5. Each support slot 7 is shaped so that it matches the outer contour of the pot to be gripped by the pot gripper. In addition, the first jaw 5 extends from the first handle 17 in an inclined manner. The first jaw 5 further comprises a first flange portion 14 on each side of the first jaw 5. Each first flange portion 14 vertically extends from the first jaw 5. Each first flange portion 14 may comprise a resilient surface portion 16 that can be compressed by the pot when the pot is gripped by the pot gripper 1. In addition, the resilient surface portion 16 may further act as heat insulation so that heat is not transferred from the pot to the first handle 17 when the pot gripper 1 is attached to the pot while the pot is standing on top of the ignited burner.

Figure 8:
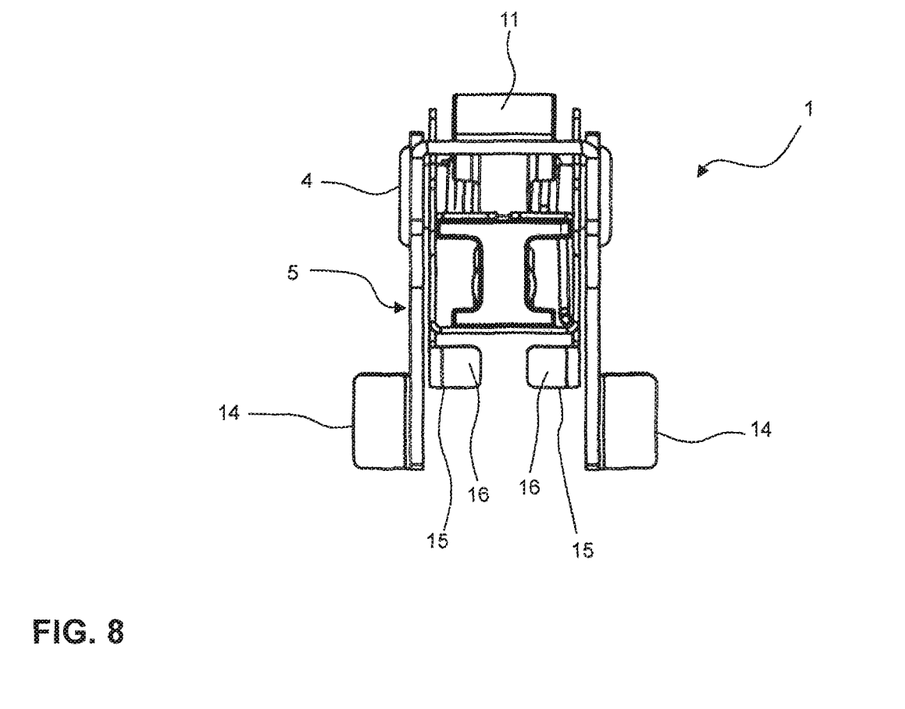
FIG. 8 is a back view of the pot gripper shown in the closed position.
Figure 9:
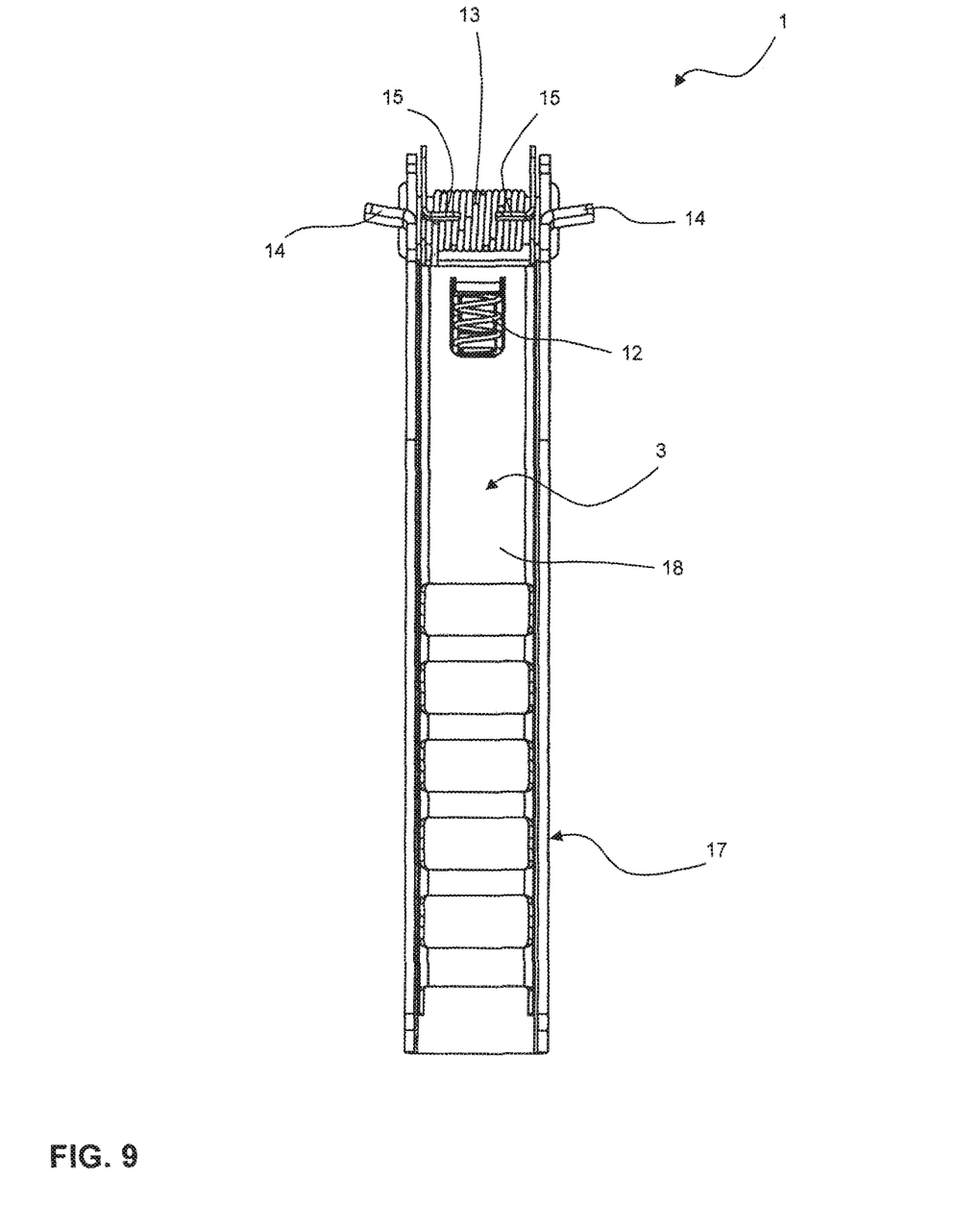
FIG. 9 is a bottom view of the pot gripper.
Figure 10:
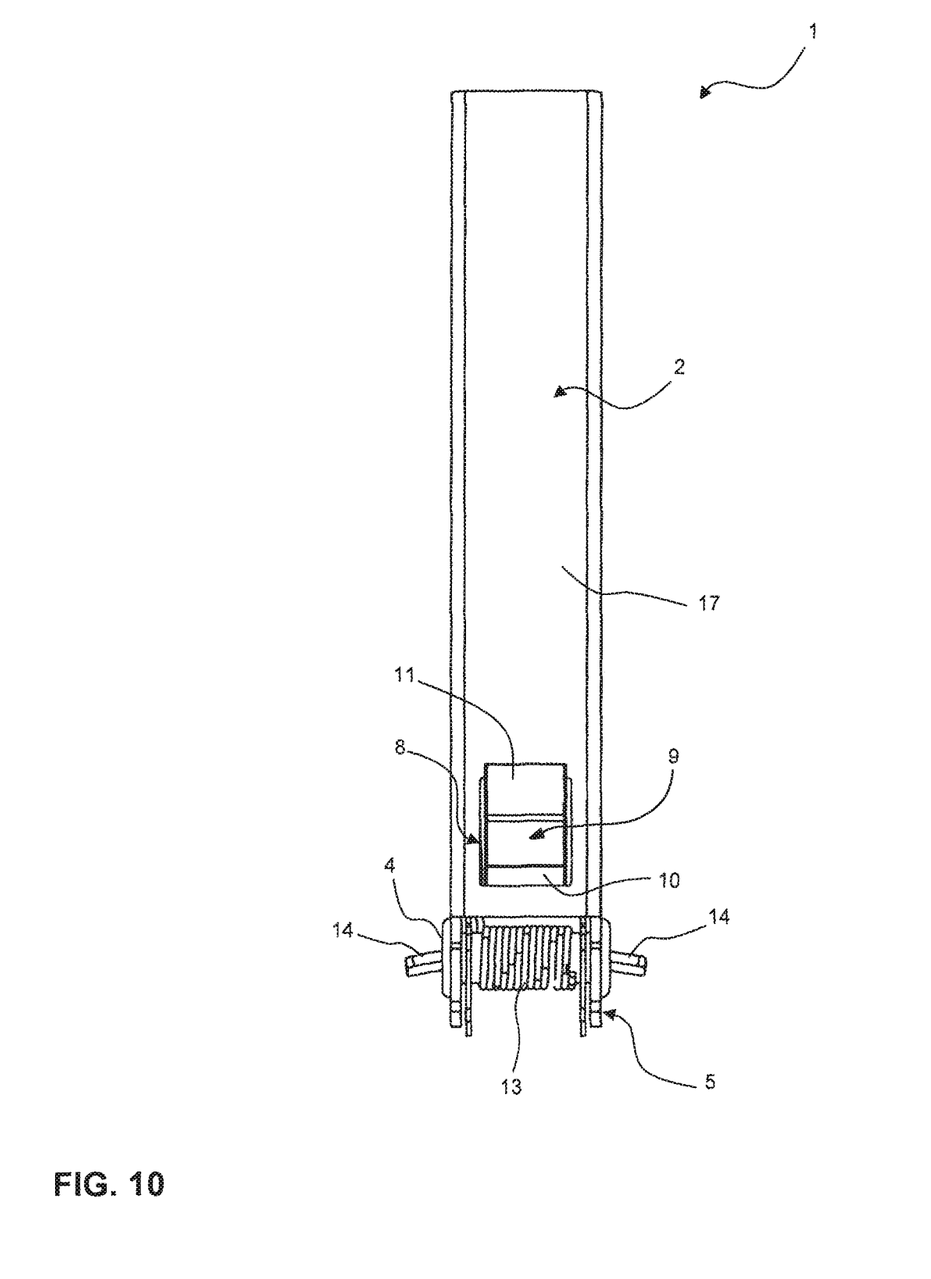
FIG. 10 is a top view of the pot gripper.

The second jaw 6 comprises a second flange portion 15 on each side of the second jaw 6. As can be seen, e.g., in FIG. 8, the second flange portion 15 vertically extends from the second jaw 6. The second flange portion 15 extends in a direction opposite to the extension direction of the first flange portion 14. In addition, each second flange portion 15 may comprise a resilient surface portion 16 that can be compressed by the pot when the pot is gripped by the pot gripper 1. In addition, the resilient surface portion 16 may further act as heat insulation so that heat is not transferred from the pot to the second handle 18 when the pot gripper 1 is attached to the pot while the pot is standing on top of the ignited burner.

As can be seen in FIG. 1, the first flange portion 14 and the second flange portion 15 are arranged at the first jaw 5 and the second jaw 6 so that the first flange portion 14 abuts against an outer circumferential portion of the pot and the second flange portion 15 abuts against an inner circumferential portion of the pot when the pot gripper 1 is in the closed portion CP, i.e., when the pot is gripped.

Furthermore, the pot gripper 1 comprises a spring member 13 in the form of a torsion spring being arranged between the first lever 2 and the second lever 3. When moving the pot gripper 1 from the closed position CP, the second lever 3 is biased in the open position OP. In other words, when rotating the second lever 3 in the closed position CP, the user has to rotate the second lever 3 against the biasing force of the spring member 13.

The pot gripper 1 further comprises a locking mechanism composed of a first locking means 8 and a second locking means 9. The first locking means 8 is provided on the first lever 2 and the second locking means 9 is associated with the second lever 3. In particular, the first locking means 8 comprises an opening 10 and the second locking means 9 comprises a catch 11. The catch 11 reaches through and engages with the opening 10 when the pot gripper 1 is in the closed position. Thus, the first lever 2 and the second lever 3 are locked against further movement relative to each other.

To unlock the first lever 2 and the second lever 3 for rotation, the catch 11 is manually displaced against a biasing force caused by a biasing member 12 of the second locking means 9, cf. FIG. 12. The catch 11 is manually pushed through the opening 10 so that the engagement between the catch 11 and the opening 10 is released. Thus, the pot gripper 1 automatically moves into the open position OP as the second lever 3 is displaced due to the biasing force of the spring member 13. When moving the pot gripper 1 again in the closed position CP, the catch 11 automatically engages with the opening 10, as it is displaced again by the biasing force of the biasing member 12.

LIST OF REFERENCE SIGNS 1 pot gripper
2 first lever
3 second lever
4 fulcrum
5 first jaw
6 second jaw
7 support slot
8 first locking means
9 second locking means
10 opening
11 catch 12 biasing means/coil spring
13 spring member/torsion spring
14 first flange portion
15 second flange portion
16 surface portion
17 first handle
18 second handle
CP closed position
OP open position

The invention claimed is:

1. A pot gripper, comprising:
a first lever; and
a second lever being joined at a fulcrum with the first lever, the first lever having a first jaw extending from the fulcrum, and the second lever having a second jaw extending from the fulcrum;
wherein the first jaw and the second jaw define a clamping area extending at one end of the first lever and the second lever for a pot when the first lever and the second lever are rotated from an open position into a closed position, and the first jaw has at least one support slot, the support slot being shaped to fit to the contour of a gripping area of the pot to be held in the clamping area;
wherein the first lever has a first locking means and the second lever has a second locking means, and the first locking means engages with the second locking means in the closed position so that the first lever and the second lever are locked in the closed position, wherein the first locking means comprises an opening and the second locking means comprises a catch, the catch reaching through the opening in the closed position; and
wherein the second locking means further comprises a biasing means, the catch being manually moveable against a biasing force of the biasing means when the first lever and the second lever are in the closed position so that the first lever and the second lever are unlocked and wherein the biasing means comprises a coil spring;
wherein the first jaw has at least one first flange portion, the first flange portion being configured to abut against an outer circumferential surface of the pot when the first lever and the second lever are in the closed position and wherein the second jaw has at least one second flange portion, the second flange portion being configured to abut against an inner circumferential surface of the pot when the first lever and the second lever are in the closed position; and
wherein the second flange portion extends in a direction opposite to the extension direction of the first flange portion.

2. The pot gripper of claim 1, further comprising a spring member, the spring member biasing the first lever and/or the second lever into the open position.

3. The pot gripper according to claim 1, wherein at least one of the first flange portion and the second flange portion has a resilient surface portion, wherein the resilient surface portion is compressible by the pot when the first lever and the second lever are moved from the open position into the closed position.

4. The pot gripper of claim 1, wherein the first jaw and the second jaw comprise insulation means for insulating of the first lever and the second lever from heat.

5. The pot gripper of claim 1, wherein the first lever has a first handle extending form the fulcrum and the second lever has a second handle extending from the fulcrum; and wherein the first jaw is inclined relative to the first handle and/or the second jaw is inclined relative to the second handle.

6. A cooking system, comprising:
a pot gripper as recited in claim 1; and
a pot; wherein an outer circumferential surface of the pot is free of a supporting structure.

7. The cooking system of claim 6, wherein the pot has a circumferential gripping area at an open side of the pot, and wherein a diameter of the gripping area increases when seen from a bottom area of the pot.

8. A pot gripper, comprising:
a first lever; and
a second lever joined to the first lever at a fulcrum, the first lever having a first jaw extending from the fulcrum, and the second lever having a second jaw extending from the fulcrum;
wherein the first jaw and the second jaw define a clamping area at one end of the first lever and the second lever for a pot when the first lever and the second lever are rotated from an open position into a closed position, the first lever has a first locking means and the second lever has a second locking means, and the first locking means engages with the second locking means in the closed position so that the first lever and the second lever are locked in the closed position;
wherein the first locking means comprises an opening and the second locking means comprises a catch, the catch reaching through the opening in the closed position;
wherein the second locking means further comprises a biasing means, the catch being manually moveable against a biasing force of the biasing means when the first lever and the second lever are in the closed position so that the first lever and the second lever are unlocked and wherein the biasing means comprises a coil spring;
wherein the first jaw has at least one first flange portion, the first flange portion being configured to abut against an outer circumferential surface of the pot when the first lever and the second lever are in the closed position and wherein the second jaw has at least one second flange portion, the second flange portion being configured to abut against an inner circumferential surface of the pot when the first lever and the second lever are in the closed position; and
wherein the second flange portion extends in a direction opposite to the extension direction of the first flange portion.

9. The pot gripper of claim 8, further comprising a spring member, the spring member biasing the first lever and/or the second lever into the open position.

10. The pot gripper of claim 8, wherein the first jaw and the second jaw comprise insulation means for insulating of the first lever and the second lever from heat.

11. A cooking system, comprising:
a pot gripper as recited in claim 8; and
a pot; wherein an outer circumferential surface of the pot is free of a supporting structure.

12. The cooking system of claim 11, wherein the pot has a circumferential gripping area at an open side of the pot, and a diameter of the gripping area increases when seen from a bottom area of the pot.

* * * * *